United States Patent
Odaohhara et al.

(10) Patent No.: US 10,547,169 B2
(45) Date of Patent: Jan. 28, 2020

(54) METHOD FOR IMPROVING SAFETY OF VOLTAGE REGULATOR

(71) Applicant: LENOVO (SINGAPORE) PTE. LTD., Singapore (SG)

(72) Inventors: Shigefumi Odaohhara, Kanagawa-ken (JP); Jonathan Randall Hinkle, Raleigh, NC (US)

(73) Assignee: LENOVO (SINGAPORE) PTD LTE, Singapore (SG)

(*) Notice: Subject to any disclaimer, the term of this patent is extended or adjusted under 35 U.S.C. 154(b) by 0 days.

(21) Appl. No.: 16/132,067

(22) Filed: Sep. 14, 2018

(65) Prior Publication Data
US 2019/0013663 A1 Jan. 10, 2019

Related U.S. Application Data

(62) Division of application No. 14/735,843, filed on Jun. 10, 2015, now abandoned.

(30) Foreign Application Priority Data

Jun. 14, 2014 (JP) .................................. 2014-122932

(51) Int. Cl.
*H02H 3/08* (2006.01)
*H02H 5/04* (2006.01)
*H02H 9/00* (2006.01)

(52) U.S. Cl.
CPC ............ *H02H 3/085* (2013.01); *H02H 5/041* (2013.01); *H02H 5/042* (2013.01); *H02H 9/001* (2013.01)

(58) Field of Classification Search
CPC ........ H02H 3/085; H02H 9/001; H02H 5/041; H02H 5/042
USPC ......................................................... 361/93.8
See application file for complete search history.

(56) References Cited

U.S. PATENT DOCUMENTS

2015/0303679 A1* 10/2015 Li .......................... H02H 5/042
361/106

OTHER PUBLICATIONS

CN 2013/10119670 (Year: 2013).*

* cited by examiner

*Primary Examiner* — Dharti H Patel
(74) *Attorney, Agent, or Firm* — Anthony P. Ng; Russell Ng PLLC (57) ABSTRACT

A method for improving safety of voltage regulator is disclosed. In order to improve safety of a voltage regulator, a MOS-FET is disposed on a source power lane that receives power supplied from a DC power supply. A set of voltage regulators is connected to a set of fork power lanes, correspondingly, branching off from the source power lane. PTC thermistors are disposed on a surface or in the vicinity of semiconductor chips of the voltage regulators. When temperature at any one of the PTC thermistors increases, a protection controller turns off the MOS-FET. When temperature detected by a temperature sensor incorporated within the semiconductor chip has increased, each of the voltage regulators turns off the MOS-FET via a base management controller.

4 Claims, 6 Drawing Sheets

(PRIOR ART)

METHOD FOR IMPROVING SAFETY OF VOLTAGE REGULATOR

PRIORITY CLAIM

The present application claims benefit of priority under 35 U.S.C. §§ 120, 365 to the previously filed Japanese Patent Application No. JP2014-122932 with a priority date of Jun. 14, 2014, which is incorporated by reference herein.

BACKGROUND OF THE INVENTION

1. Technical Field

The present invention relates to voltage regulators in general, and particularly to a method for improving the safety of a voltage regulator having a switching element, and to a method for preventing smoking and burning of a switching element.

2. Description of Related Art

Figure 7:
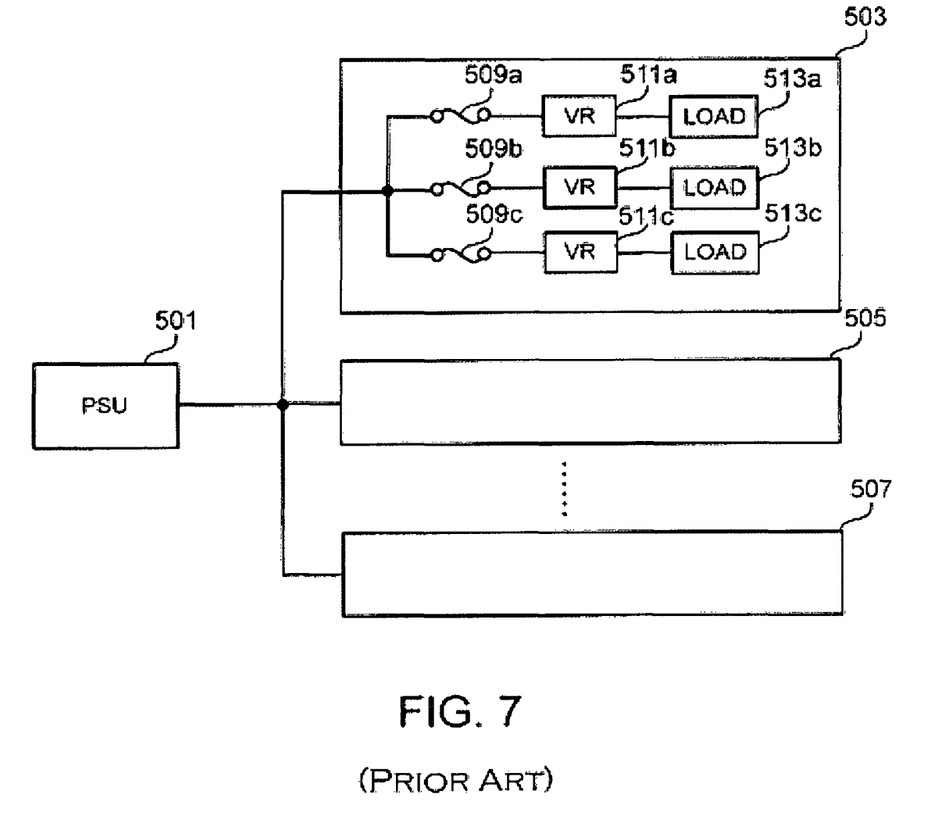
FIG. 7 is a block diagram of a typical power-supply system used for a server.

FIG. 7 describes the outline of a typical power-supply system used for a server. A power-supply unit (PSU) 501 supplies power to a group of sub-systems 503 to 507 making up a server with DC voltage. Each sub-system 503 to 507 is mainly made up of voltage regulators (VRs) 511$a$ to 511$c$ that convert the output voltage of the PSU 501 to predetermined voltage and loads 513$a$ to 513$c$ corresponding to the VRs, such as a central processing unit (CPU), a memory, and a hard disk drive (HDD). The VRs 511$a$ to 511$c$ are provided with fuses 509$a$ to 509$c$, respectively, on the primary side. The sub-system 503 is configured so that, even when power supplied to any one of the loads 513$a$ to 513$c$ stops, the function of the sub-system does not stop completely as long as power is supplied to other loads.

A conventional DC power-supply apparatus including a switching element is configured to protect the circuit by turning the switching element OFF when the load generates a short-circuit failure. The switching element can function as the protection switch against a short-circuit failure only when such a switching element normally operates. Since switching elements are manufactured with a relatively high level of reliability, and so cause less failure in general, such a protective idea may not have a problem in that sense.

In the power-supply system of FIG. 7, if the switching elements in the close state of the VRs 511$a$ to 511$c$ fail and so short-circuit current flow, the fuses 509$a$ to 509$c$ on the primary side can be molten so as to interrupt the related system only. Since the fuses 509$a$ to 509$c$ do not require a control circuit and are inexpensive, such a protective idea is rational for the failure of a switching element that hardly causes a failure.

In the power-supply system of FIG. 7; however, the VRs 511$a$ to 511$c$ may cause smoking and burning. Investigations on such a phenomenon show that a switching element burns severely. A direct cause of the burning of a switching element results from the element generating a large amount of heat due to large current. If a switching element in the close state fails, short-circuit current flowing will cause burnout of any one of the fuses 509$a$ to 509$c$. However, smoking or burning generated means that the fuses 509$a$ to 509$c$ do not melt, or the timing of the melting, if any, may not work together with the circuit.

The fuses 509$a$ to 509$c$ have to have elements that is not degraded due to repeated inrush current when energization starts at the VRs 511$a$ to 511$c$, and since they are disposed to protect the circuit from short-circuit, its blowout current is quite larger than the rated current of the VRs 511$a$ to 511$c$, and its pre-arcing time also has to be longer. In one example, the fuses 509$a$ to 509$c$ have current-time characteristics such that it takes two minutes to cause a blowout when current twice of the rated current of the VRs 511$a$ to 511$c$ flows. Such a current value and energizing time are sufficient to cause smoking and burning at the switching elements.

If a switching element whose resistance is close to zero causes a short-circuit failure (this is called dead short-circuit), the pre-arcing time is short in spite of a large current value, and so the fuses 509$a$ to 509$c$ can be molten prior to smoking and burning so as to interrupt the circuit. Recent studies show that, however, if the switching element having some resistance causes a short-circuit failure (this is called resistance short-circuit), the switching element causes smoking and burning to interrupt the circuit before burnout of the fuses 509$a$ to 509$c$ or without causing a burnout of the fuses 509$a$ to 509$c$.

Switching elements are degraded over time because they frequently turn ON/OFF. If a switching element burns while generating heat severely, all of the devices around it may be damaged or a normal sub-system also has to be replaced in some cases. Further, if a switching element generates heat, it causes the risk of fire, and so it is not favorable to leave such a situation unsolved even when the risk is small. The PSU 501 has to supply power to each sub-system 503 to 507, and so has large rated current compared with the VRs 511$a$ to 511$c$, and so the protection circuit thereof also cannot prevent smoking and burning when resistance short-circuit occurs at the switching element.

Another problem occurs, which results from the loads 513$a$ to 513$c$ including a device that receives power from VRs 511$a$ to 511$c$. For instance, when the load 513$b$ includes a device receiving power from the VR 511$a$ as well, and if the fuse 509$a$ is molten, the device receives power continuously from the VR 511$b$ in spite of stopping of the power-supply from the VR 511$a$. Then the device of the load 513$b$ generates latch up, which increases the risk leading to secondarily generated smoking and burning.

Consequently, it would be desirable to provide a power-supply system having improved safety against resistance short-circuit of a switching element.

SUMMARY OF THE INVENTION

In accordance with a preferred embodiment of the present invention, a power-supply system includes a protection switch disposed on a power lane receiving power supply from a DC power supply, a group of voltage regulators, each having a switching element and branching off from the power lane, a temperature sensor for detecting temperature of the voltage regulators, and a controller for turning the protection switch OFF when temperature at any one of the voltage regulators increases and stops power supplied to the group of voltage regulators. With this configuration, if the switching element fails due to resistance short-circuit, the protection switch can be turned OFF in response to the detection of temperature such that smoking and burning can be prevented.

When the switching element is incorporated into a semiconductor chip, the temperature sensor can detect temperature at a surface or vicinity of the semiconductor chip. Temperature is detected from the outside of the semiconductor chip, whereby the temperature sensor is not affected from a sudden increase in temperature, if any, and can turn the protection switch OFF reliably. The temperature sensor may include a PTC thermistor. When temperature detected by the temperature sensor incorporated in the semiconductor chip increases, the controller can turn the protection switch OFF.

A temperature sensor for detecting temperature outside of the semiconductor chip, and a temperature sensor for detecting temperature inside thereof are provided, whereby reliable protection can be provided even when the switching element generates heat suddenly. When ON resistance or OFF resistance of the switching elements calculated from voltage and current increases, the voltage regulators may send a signal to turn the protection switch OFF to the controller. The present invention is suitable for the case where the group of voltage regulators include a first voltage regulator and a second voltage regulator that output mutually different voltages, and loads of the voltage regulators include a device that operates with output voltage from the first voltage regulator and output voltage from the second voltage regulator. With this configuration, if abnormality occurs at any one of the voltage regulators, all of the voltage regulators stop, and so latch up of the device as a load can be prevented.

All features and advantages of the present disclosure will become apparent in the following detailed written description.

BRIEF DESCRIPTION OF THE DRAWINGS

The disclosure itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

A power-supply system according to the present invention preferably is applicable to a set-type computer system. A set-type computer system includes a group of computer units, each having an equivalent computer function. Each computer unit includes hardware such as a processor, a system memory, an input/output (I/O) controller, a memory and a peripheral device, and software such as an operating system and an application program.

Each computer unit receives power from a power-supply unit (PSU) that converts utility power to DC voltage. Only one PSU may be provided for the computer system, or one PSU may be provided for a group of a plurality of computer units. Each computer unit includes a group of sub-systems. Each sub-system includes a group of voltage regulators (VRs). The set-type computer system may be implemented as a rack-mountable server, a blade server, a router or the like.

Figure 1A:
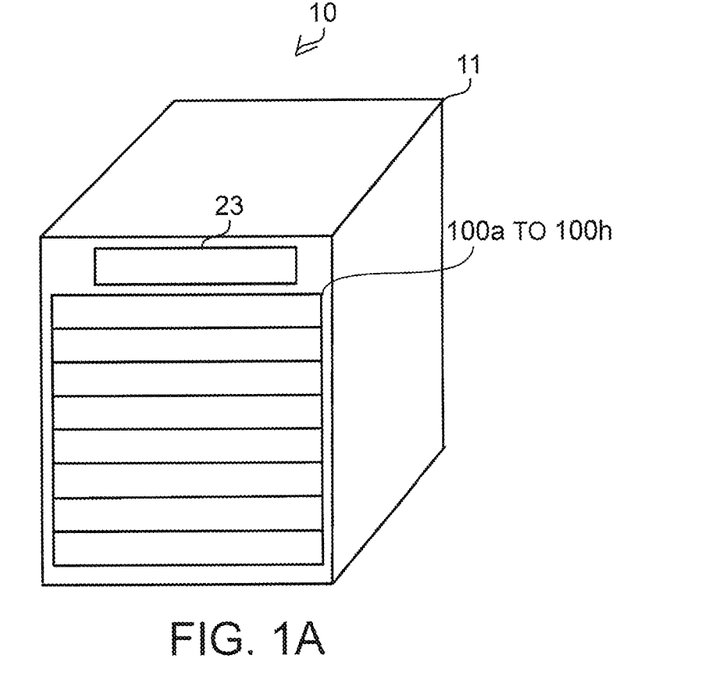
FIGS. 1A-1B are diagrams of a blade server.
Figure 1B:
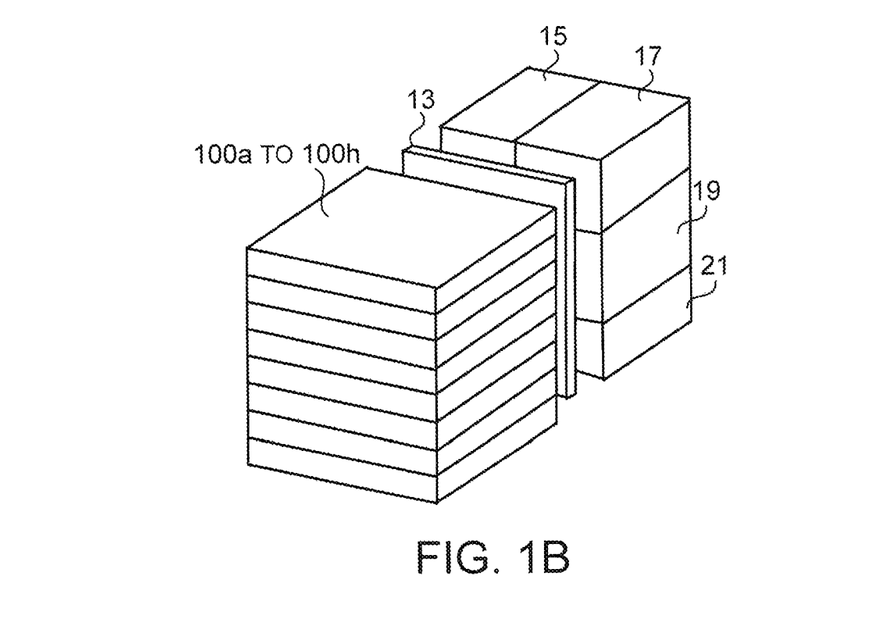
Figure 2:
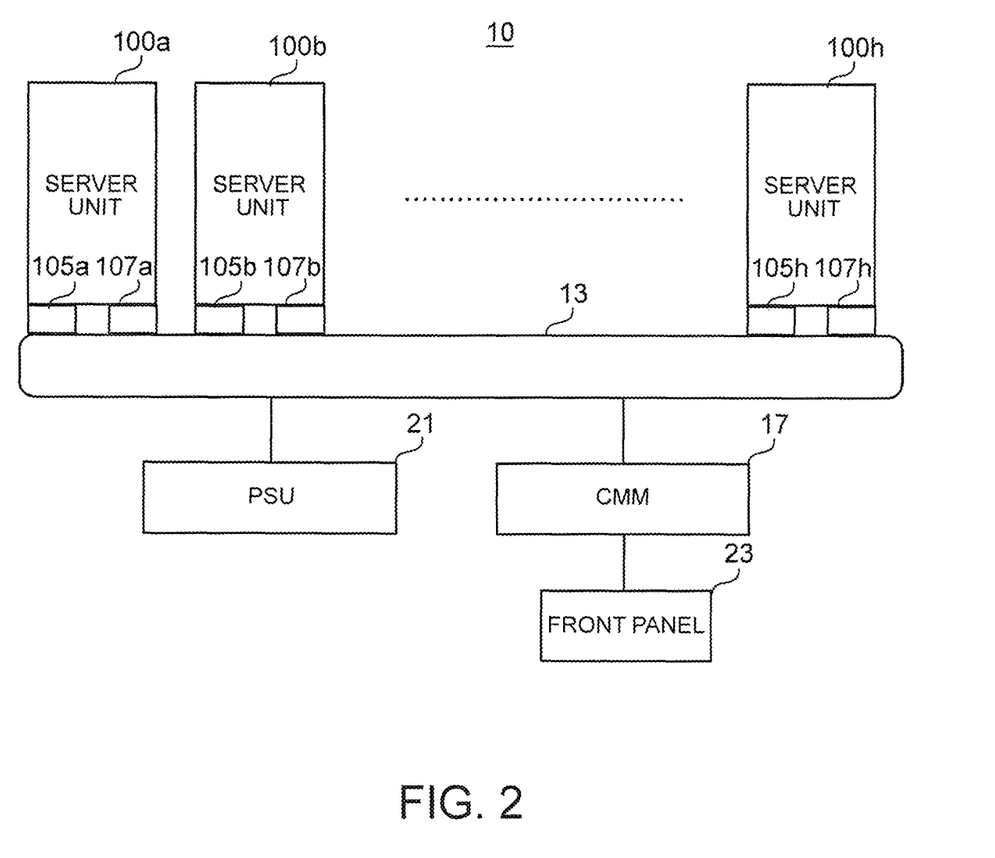
FIG. 2 is a block diagram of the blade server from FIG. 1.
Figure 3:
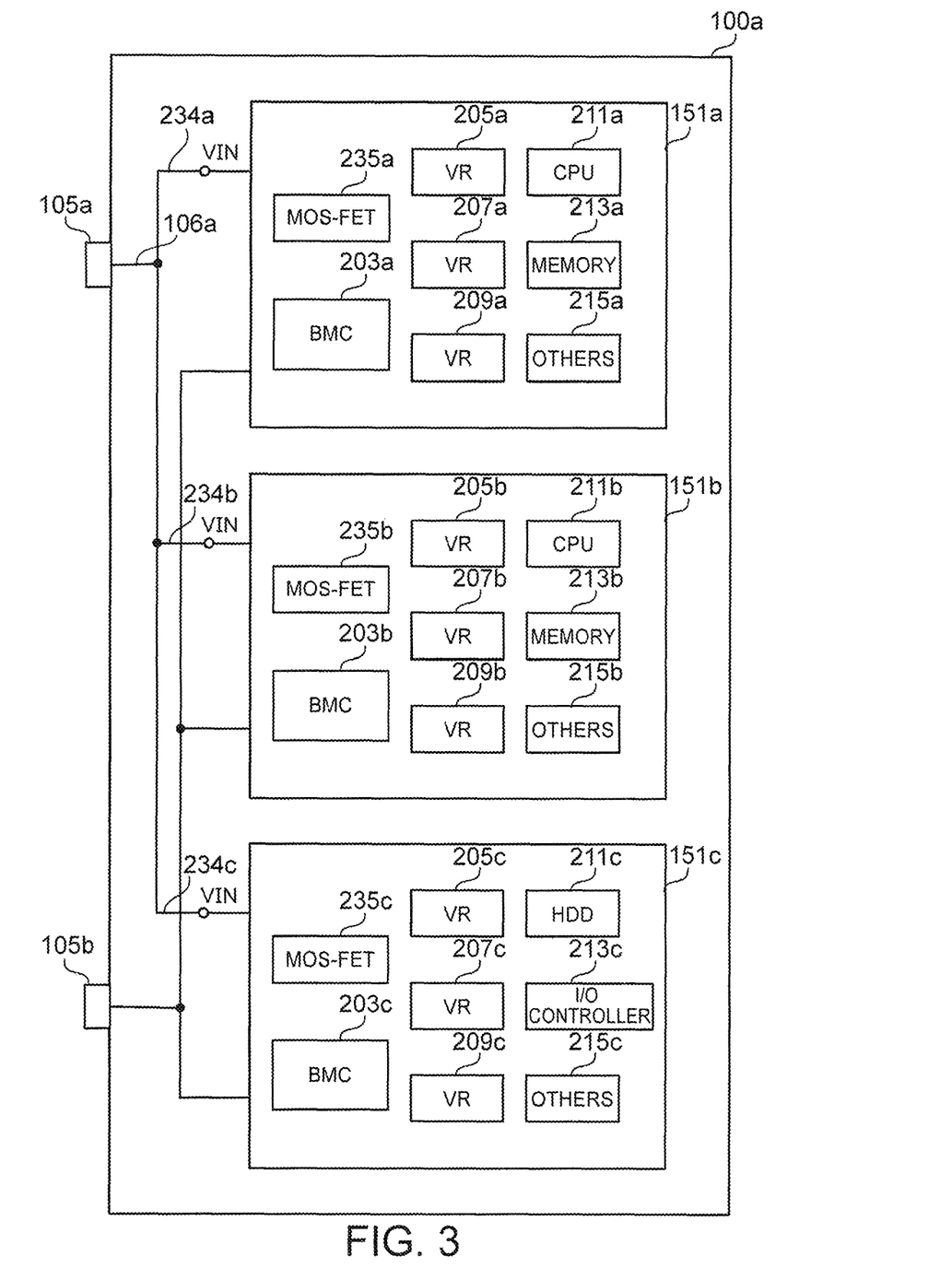
FIG. 3 is a block diagram of the sub-systems within a server unit of the blade server from FIG. 1.

FIGS. 1 to 3 describe the outline of a blade server 10. FIG. 1A illustrates the outside shape of the blade server 10, and FIG. 1B illustrates the internal configuration. FIG. 2 illustrates the outline of a power-supply system including a PSU 21 and server units 100a to 100h, and FIG. 3 is a block diagram of a group of sub-systems making up the server unit 100a.

In FIG. 1A, a rack 11 includes a front panel 23 on the surface, and internally accommodates the plurality of server units 100a to 100h, a midplane 13, a switch module 15, a chassis management module (CMM) 17, a fan module 19 and the PSU 21. Each server unit 100a to 100h includes a mother-board in an independent enclosure, and internally includes hardware and software resources to operate as an independent computer.

The midplane 13 is a circuit board including wiring for signals and power and connectors on both faces for coupling with the modules. The server unit 100a to 100h can connect to the midplane 13 that is energized with the output voltage from the PSU 21 in a hot-swap manner. The switch module 15 includes a group of switches for connection to a network or an external memory. The CMM 17 is to inform the operating state of the blade server 10 to a distance or to display it on the front panel 23. The fan module 19 dissipates heat inside of the rack 11. The PSU 21 converts AC voltage to DC voltage, and supplies power to the server units 100a to 100h and other modules.

In FIG. 2, the server units 100a to 100h are connected to the midplane 13 at their power terminals 105a to 105h and signal terminals 107a to 107h. Then the PSU 21 and the CMM 17 are connected to the midplane 13. The CMM 17 is connected to the front panel 23. The PSU 21 supplies power to each server unit 100a to 100h via the midplane 13 and the power terminals 105a to 105h.

In FIG. 3, at the power terminal 105a of the server unit 100a, source power lanes 234a to 234c are connected to a route power lane 106a. The source power lanes 234a and 234b are connected to main sub-systems 151a and 151b, respectively, and the source power lane 234c is connected to a common sub-system 151c. Herein the route power lane 106a corresponds to a circuit that supplies power from the PSU 21 to the three sub-systems 151a to 151c, and the source power lanes 234a to 234c correspond to a circuit that supplies power to the three sub-systems 151a to 151c.

The main sub-systems 151a and 151b each include a CPU and a system memory, and operate mutually independently. The common sub-system 151c includes an I/O controller and a HDD that both or one of the main sub-systems 151a and 151b have to use to function as a computer, and does not function independently. In the application of the present invention, the number of the main sub-systems 151a and 151b may be one or more. The function of the common sub-system 151c may be incorporated into each main sub-system 151a or 151b and be omitted. The sub-systems 151a to 151c include MOS-FETs 235a to 235c for protection, base management controllers (BMC) 203a to 203c, VRs 205a to 209a, 205b to 209b, and 205c to 209c, respectively.

The VRs are switching regulators to convert output voltage from the PSU 21 to predetermined stable voltage in accordance with the load. The VRs 205a to 209a supply power to loads 211a to 215a, such as a CPU and a system memory, the VRs 205b to 209b supply power to loads 211b to 215b, such as a CPU and a system memory, and the VRs 205c to 209c supply power to loads 211c to 215c, such as a HDD and an I/O controller. The BMCs 203a to 203c inform the CMM 17 of the operating state of the sub-systems 151a to 151c via the signal terminal 105b, and control the MOS-FETs 235a to 235c.

Figure 4:
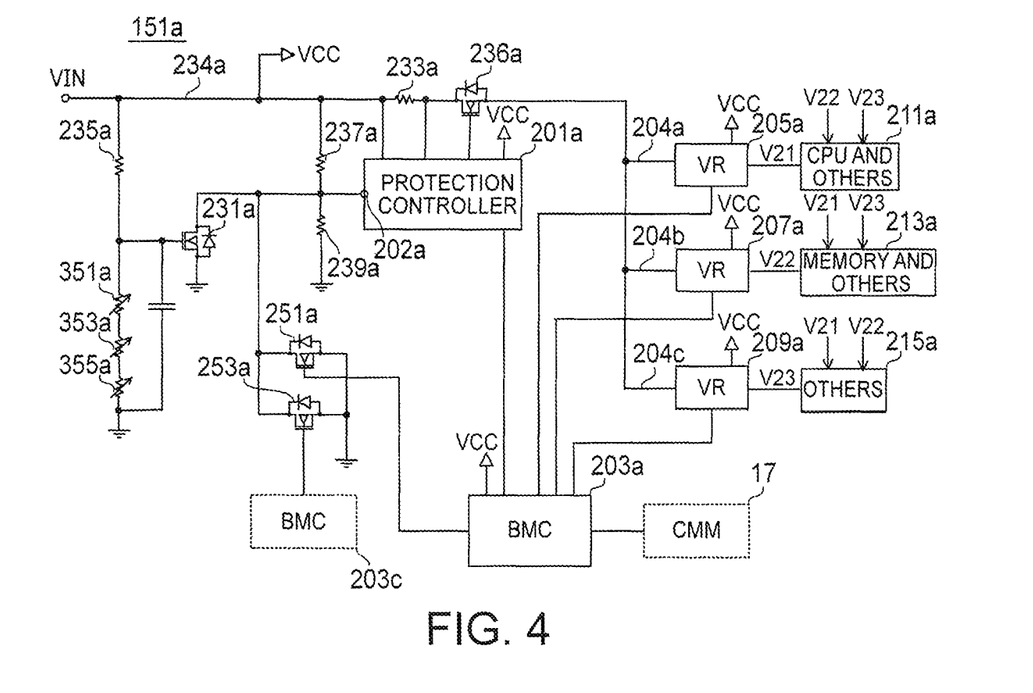
FIG. 4 is a schematic diagram of a main sub-system within one of the sub-systems from FIG. 3.

FIG. 4 is a schematic diagram describing the circuit configuration of the main sub-system 151a. The PSU 21 supplies power to an input terminal VIN on the source power lane 234a via the route power lane 106a. The input terminal VIN is connected in series with a current sense resistor 233a and an n-type MOS-FET 235a. The current sense resistor 233a has both ends connected to a protection controller 201a. The MOS-FET 235a has a gate connected to the protection controller 201a. Fork power lanes 204a to 204c branch off from the MOS-FET 235a, to each of which the VR 205a to 209a is connected.

The fork power lanes 204a to 204c correspond to a circuit that supplies power to their corresponding VRs 205a to 209a. The VRs 205a to 209a output stable and predetermined voltage V21, V22 and V23, respectively, for use at their corresponding loads 211a to 215a. The VR 205a supplies power to the load 211a mainly including a CPU, the VR 207a supplies power to the load 213a mainly including a system memory, and the VR 209a supplies power to the load 215a including another device.

Some devices included in the loads 211a to 215a operate with voltage output from another VR and with a plurality of voltages. The input terminal VIN is connected to the ground via a resistor 236a and Positive Temperature Coefficient (PTC) thermistors 351a to 355a connected in series. The PTC thermistors 351a to 355a are elements having flat temperature-resistor characteristics at normal temperatures, but suddenly increasing in resistance when the temperature exceeds a certain level (Curie temperature).

The PTC thermistors 351a to 355a are disposed so as to measure temperature at the surface or environmental temperature in the vicinity of a semiconductor chip of a switching circuit 303 (FIG. 5) making up the VR 205a to 209a. A n-type MOS-FET 231a has a gate connected to a connecting point of the resistor 236a and the PTC thermistor 351a, a drain connected to a terminal 202a of the protection controller 201a, and a source connected to the ground. The drain of the MOS-FET 231a is connected to a connecting point between voltage-dividing resistors 237a and 239a connected in series between the input terminal VIN and the ground.

The drain of the MOS-FET 231a is connected to drains of n-type MOS-FETs 251a and 253a that are connected in parallel. The MOS-FETs 251a and 253a have sources connected to the ground. The MOS-FET 251a has a gate connected to the BMC 203a. The MOS-FET 253a has a gate connected to the BMC 203c included in the common sub-system 151c.

A power-supply terminal VCC supplies power for driving of the protection controller 201a, the VRs 205a to 209a and the BMC 203a. The main sub-system 151b also has a similar configuration, and the common sub-system 151c is different in that it does not include a MOS-FET corresponding to the MOS-FET 253a that operates with a signal of the BMC 203a, 203b of another main sub-system 151a, 151b.

Figure 5:
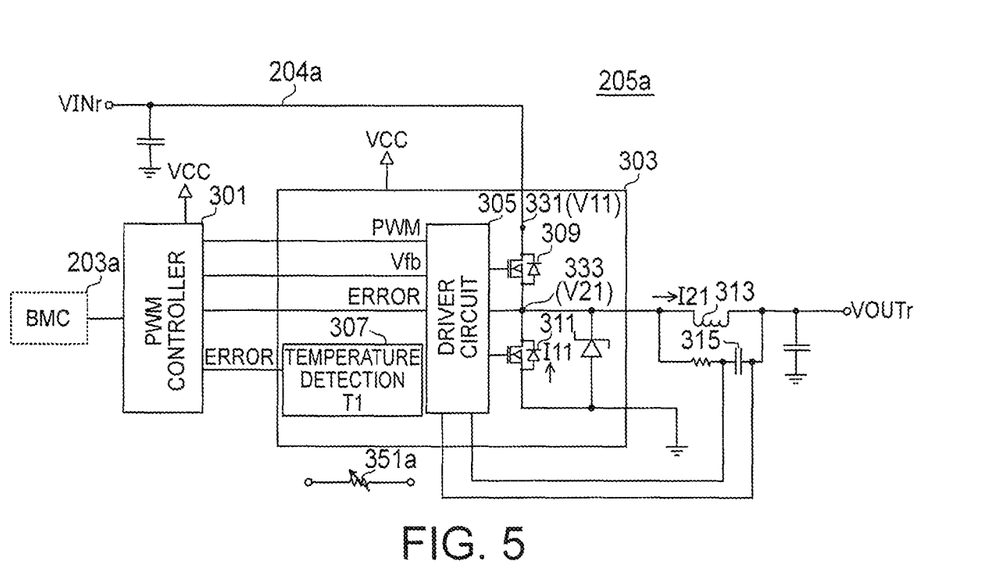
FIG. 5 is a schematic diagram of a voltage regulator.

FIG. 5 is a schematic diagram describing the circuit configuration of the VR 205a. Although the VR 205a actually includes still more elements, FIG. 5 illustrates the elements in the range required for understanding of the present invention. The VR 205a mainly includes a PWM controller 301, a switching circuit 303 and a reactor 313. The switching circuit 303 is configured so as to include a driver circuit 305, n-type MOS-FETs 309 and 311, a temperature detection circuit 307 and the like incorporated into one semiconductor chip.

The driver circuit 305 receives a PWM signal from the PWM controller 301 and switching-controls the MOS-FETs 309 and 311 connected in series in the fork power lane 204a in a synchronous rectification manner so as to convert input voltage V11 to stable output voltage V21 and outputs it to an output terminal VOUTr via a node 333 and the reactor 313. The driver circuit 305 includes an operational amplifier, and so measures current I11 flowing through the MOS-FET 311 that is calculated from the input voltage V11 at the node 331, the output voltage V21 at the node 333, the ON resistance of the MOS-FET 311 on the low side and the voltage at the node 333, output current I21 calculated from the resistance of the reactor 313 and the voltage at a capacitor 315, and the like.

The driver circuit 305 feedbacks the output voltage V21 at the node 333 to the PWM controller 301. Then the PWM controller 301 compares the fed-back voltage Vfb with set voltage to control the duty ratio of the PWM signal. If abnormality occurs in the input voltage V11, the output voltage V21, the current I21, I22 and the like, and if ON resistance or OFF resistance of the MOS-FETs 309 and 311 calculated from voltage and current changes by a preset value or more, the driver circuit 305 outputs an error signal to the PWM controller 301.

The temperature detection circuit 307 includes a temperature sensor incorporated into the semiconductor chip of the switching circuit 303, and if the internal temperature T1 of the semiconductor chip exceeds a predetermined value, then the temperature detection circuit sends an error signal to the PWM controller 301. Receiving an error signal from the driver circuit 305 or the temperature detection circuit 307, the PWM controller 301 outputs the error signal to the BMC 203a. The error signal may be sent directly from the driver circuit 305 to the BMC 203a by skipping the PWM controller 301.

The PTC thermistor 351a is attached to the surface of the switching circuit 303 or the vicinity thereof, and is connected in series with other PTC thermistors 353a and 355a between the input terminal VIN (FIG. 4) of the source power lane 234a and the ground in a circuit independent of the VR 205a. The VRs 207a and 209a also may be configured similarly.

Note here that FIGS. 1 to 5 illustrate simplified configuration and connection relationship of major hardware relating to the present embodiment to describe the present embodiment. In order to make up a power-supply system, many other devices are used other than those described in the above. Since they are well-known for those skilled in the art, detailed descriptions thereof are omitted here. A group of blocks illustrated in the drawing may be one integrated circuit or device, or conversely one block may be divided into a plurality of integrated circuits or devices, which also are included in the scope of the present invention as long as they are in the range where those skilled in the art can select freely.

Figure 6:
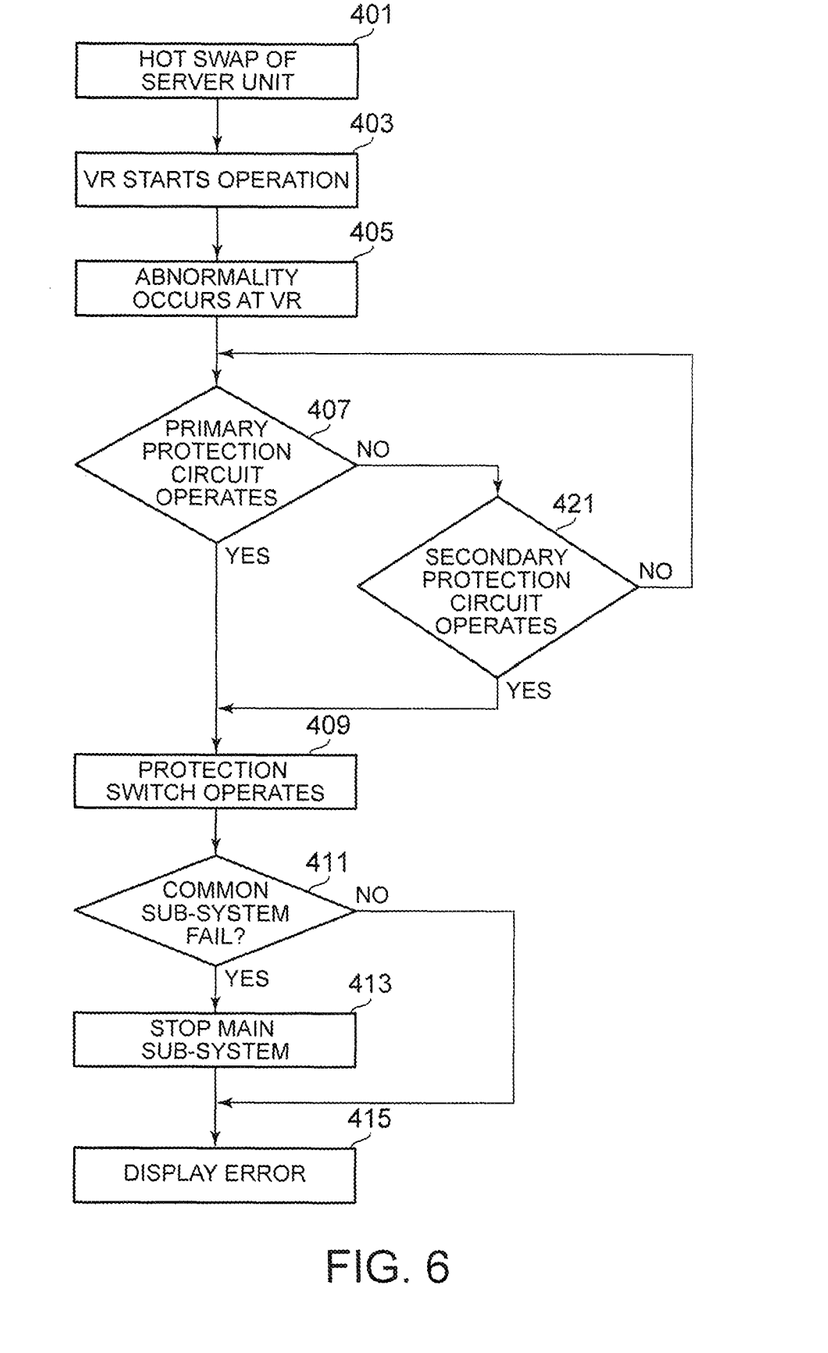
FIG. 6 is a flow diagram describing the operation of the power-supply system.

Referring now to the flow diagram of FIG. 6, the operation of the power-supply system in FIGS. 4 and 5 is described below. The following mainly describes the operation of the main sub-system 151a, and the operation of the main sub-system 151b and the common sub-system 151c also can be understood similarly. At block 401, the power terminal 105a and the signal terminal 105b of the server unit 100a are connected to the midplane 13 in the energization state. Then the protection controller 201a of the main sub-system 151a is turned ON. At this time, the MOS-FETs 231a, 251a and 253a are OFF.

When the protection controller 201a detects input voltage VIN via the voltage-dividing resistors 237 and 239, the protection controller controls the gate voltage of the MOS-FET 235a to suppress inrush current. When the inrush current disappears, the protection controller 201a turns the MOS-FET 235a ON completely. Subsequently at block 403, the VRs 205a to 209a start operation to supply power to the loads 211a to 215a.

At block 405, abnormality, such as increase in ON resistance or OFF resistance of the MOS-FETs 309, 311, occurs at the VR 205a, which may be a sign of or lead to resistor short-circuit of the MOS-FET 309. At block 407, when the driver circuit 305 detects abnormality at the VR 205a from the voltage V11, V21, the current I11, I21 and the like, then the driver circuit outputs an error signal, and the procedure proceeds to block 409. When the temperature detection circuit 307 detects abnormality at the internal temperature T1 as well, the temperature detection circuit outputs an error signal, and the procedure proceeds to block 409.

At block 409, when the PWM controller 301 receives an error signal from the driver circuit 305 or the temperature detection circuit 307, then the PWM controller outputs the error signal to the BMC 203a. In response to the error signal, the BMC 203a turns the MOS-FET 251a ON. Then, the potential at the terminal 202a drops, so that the protection controller 201a turns the MOS-FET 235a OFF, meaning that power-supply to all of the VRs 205a to 209a stops. The circuit in which the driver circuit 305 or the temperature detection circuit 307 outputs an error signal to turn the MOS-FET 235a OFF is called a primary protection circuit.

When only the VR corresponding to the failure is stopped through blowout of the fuse as in the power-supply system of FIG. 7, latch up may occur at the load of the VR keeping the operation after the failure. On the other hand, in the present embodiment, latch up does not occur because all of the VRs 205a to 209a stop. Herein latch up is a phenomenon where parasitic transistor of a bipolar type that is formed at a CMOS-type integrated circuit (IC) turns a conductive state, and the IC causing latch up may be broken. The VRs 207a, 209a, the main sub-system 151b and the common sub-system 151c also operate similarly when abnormality occurs.

The primary protection circuit is effective for the case where the PWM controller 301 and the driver circuit 305 or the temperature detection circuit 307 can output an error signal. However, they may fail due to heat prior to output of an error signal. The primary protection circuit may be configured so as to send a signal directly from the driver circuit 305 or the temperature detection circuit 307 to the terminal 202a of the protection controller 201a by skipping the BMC 203a.

At block 421, when the temperature at the PTC thermistor 351a to detect temperature increases along with the operation of the primary protection circuit and exceeds the Curie temperature, then the resistance value suddenly increases. As a result, the MOS-FET 231a turns ON because the gate voltage increases, meaning that the potential at the terminal 202a decreases, and so the protection controller 201a turns the MOS-FET 235a OFF. At this time, the protection controller 201a informs the BMC 203a of stopping of power-supply to the source power lane 234a. The MOS-FET 235a turns OFF when the resistance of the PTC thermistors 353a and 355a corresponding to the VRs 207a and 209a increase as well.

The circuit where the PTC thermistors 351a to 355a turn the MOS-FET 235a OFF is called a secondary protection circuit. The secondary protection circuit is a system independent of the switching circuit 303, the PWM controller 301 and the BMC 203a making up the primary protection circuit, and so is not affected from the heat generated at the switching circuit 303. In this way, the secondary protection circuit can protect the circuit reliably even when the primary protection circuit does not function. If both of the primary protection circuit and the secondary protection circuit do not function, then the MOS-FET 309 will burn in time. Since the present embodiment has a double protection circuit, such risk is low.

If the primary protection circuit or the secondary protection circuit operates so as to stop the common sub-system 151c, then the main sub-systems 151a and 151b cannot fulfill the function as the server unit 100. At block 411, when the common sub-system 151c turns the MOS-FETs 235a to 235c for protection OFF, then the procedure proceeds to block 413. When a failure occurs at the VRs 205c to 209c, then the BMC 203c in the common sub-system 151c turns the MOS-FET 235c OFF and at the same time turns the MOS-FETs 235a and 235b of the main sub-systems 151a and 151b OFF.

The main sub-systems 151a and 151b are configured so that only one of them can fulfill the function as the server unit 100 together with the common sub-system 151c. That is, even when one of the main sub-systems 151a and 151b turns the MOS-FETs 235a and 235b OFF, this does not stop the other main-sub system and the common sub-system 151c.

At block 415, the BMC 203a to 203c that turns the MOS-FET 235a to 235c OFF informs the CMM 17 as such. Then the CMM 17 displays the error contents on the front panel 23. When the MOS-FET 235a is turned OFF through the operation of the MOS-FETs 231a, 251a, and 253a, the protection controller 201a does not return the state unless the user resets manually, so as to ensure the security.

As has been described, the present disclosure provides a method for improving the safety of a voltage regulator having a switching element.

While the disclosure has been particularly shown and described with reference to a preferred embodiment, it will be understood by those skilled in the art that various changes in form and detail may be made therein without departing from the spirit and scope of the disclosure.

What is claimed is:

1. A power-supply system comprising:
    a protection switch disposed on a power lane receiving power from a DC power supply;
    a plurality of voltage regulators, wherein one of said voltage regulators includes a switching element located within a semiconductor chip, and branching off from said power lane;
    a first temperature sensor, located within said semiconductor chip, for detecting temperature of said one voltage regulator;
    a second temperature sensor arranged on a surface of said semiconductor chip; and
    a controller for turning off said protection switch when one of said first and second temperature sensors detects a temperature increase, and for stopping power supplied to said plurality of voltage regulators.

2. The power-supply system of claim 1, wherein said protective switch inhibits incoming current when said controller stops power supplied to said voltage regulators.

3. The power-supply system of claim 1, wherein said voltage regulators send a signal to turn off said protection switch in response to an abnormality for ON/OFF resistances of said switching elements.

4. A sub-system for a computer comprising:
- a processor and a system memory;
- a protection switch disposed on a power lane receiving power from a DC power supply;
- a plurality of semiconductor chips for supplying power, each received from said power lane including a switching circuit;
- a plurality of voltage regulators, wherein one of said voltage regulators includes a switching element to supply power to said processor and said system memory, and branching off from said power lane;
- a first temperature sensor for detecting temperature of said voltage regulators; and
- a first protection circuit containing a first temperature sensor that detects temperature inside said semiconductor chip;
- a second protection circuit including a second temperature sensor that detects the surface temperature of said semiconductor chip; and
- a controller that makes said protective switch an OFF state according to temperature which said first protection circuit or said second protection circuit detected.

* * * * *